(12) United States Patent
Dahl

(10) Patent No.: US 11,739,674 B2
(45) Date of Patent: Aug. 29, 2023

(54) METHOD FOR CONTROLLING THE OPERATION OF AN ENGINE SYSTEM IN A VEHICLE

(71) Applicant: VOLVO TRUCK CORPORATION, Gothenburg (SE)

(72) Inventor: Johan Dahl, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/453,767

(22) Filed: Nov. 5, 2021

(65) Prior Publication Data

US 2022/0145789 A1 May 12, 2022

(30) Foreign Application Priority Data

Nov. 10, 2020 (EP) .................................... 20206752

(51) Int. Cl.
*F01N 3/00* (2006.01)
*F01N 3/20* (2006.01)
(Continued)

(52) U.S. Cl.
CPC ............. *F01N 3/208* (2013.01); *B60W 10/06* (2013.01); *B60W 20/16* (2016.01);
(Continued)

(58) Field of Classification Search
CPC ...... F01N 3/208; F01N 3/035; F01N 2250/02; F01N 2610/02; F01N 2900/102;
(Continued)

(56) References Cited

U.S. PATENT DOCUMENTS

| | | | | |
|---|---|---|---|---|
| 8,392,091 B2* | 3/2013 | Hebbale | ................... | F01N 9/00 60/274 |
| 9,151,205 B2 | 10/2015 | Huq et al. | | |

(Continued)

FOREIGN PATENT DOCUMENTS

| | | |
|---|---|---|
| CN | 107158946 A | 9/2017 |
| DE | 102013210896 A1 | 12/2014 |

(Continued)

OTHER PUBLICATIONS

European Search Report dated Jan. 15, 2021 in corresponding European Patent Application No. 20206752.6, 8 pages.

*Primary Examiner* — Matthew T Largi
(74) *Attorney, Agent, or Firm* — Venable LLP; Jeffri A. Kaminski

(57) ABSTRACT

A method for controlling the operation of an engine system in a vehicle. The engine system including an engine and an exhaust aftertreatment system having an SCR catalyst and a DPF. The method includes determining preview information of the vehicle operation based at least on an upcoming road event and an engine operation associated with the upcoming road event; performing, in response of the preview information, at least one of: controlling the operation of the engine system by increasing reductant injection to meet an ammonia storage threshold level; controlling the operation of the engine system by increasing the engine out NOx to reduce the ammonia storage in the SCR catalyst to meet an ammonia slip threshold level in the SCR catalyst; controlling the operation of the engine system by decreasing the engine out NOx to increase the amount of engine out particles to meet a soot threshold level in the DPF.

13 Claims, 3 Drawing Sheets

(51) Int. Cl.
  *B60W 20/16* (2016.01)
  *B60W 10/06* (2006.01)
  *B60W 30/192* (2012.01)
  *F01N 3/035* (2006.01)

(52) U.S. Cl.
  CPC ........... *B60W 30/192* (2013.01); *F01N 3/035* (2013.01); *B60W 2510/068* (2013.01); *B60W 2710/30* (2013.01); *F01N 2250/02* (2013.01); *F01N 2610/02* (2013.01)

(58) Field of Classification Search
  CPC ..... F01N 2900/1606; F01N 2900/1818; F01N 2900/1616; B60W 10/06; B60W 20/16; B60W 30/192; B60W 2510/068; B60W 2710/30
  USPC .......................................................... 60/274
  See application file for complete search history.

(56) References Cited

U.S. PATENT DOCUMENTS

| | | | | |
|---|---|---|---|---|
| 9,180,408 | B2 * | 11/2015 | Perry | ................. B01D 53/9495 |
| 9,512,764 | B2 | 12/2016 | Upadhyay et al. | |
| 2007/0042495 | A1 * | 2/2007 | Pavlova-MacKinnon | ................... F01N 3/208 436/55 |
| 2009/0272105 | A1 * | 11/2009 | Chi | ........................ F01N 3/0821 60/276 |
| 2013/0000278 | A1 * | 1/2013 | Dubkov | ................... F01N 3/208 60/276 |
| 2014/0150409 | A1 * | 6/2014 | George | ..................... F01N 9/00 60/274 |
| 2015/0285124 | A1 * | 10/2015 | Santhanam | ........... F01N 3/0842 60/274 |
| 2016/0123259 | A1 * | 5/2016 | Schäffner | .............. F02D 41/029 60/297 |
| 2016/0131011 | A1 * | 5/2016 | Hamsten | ................. F01N 3/023 60/274 |
| 2018/0135488 | A1 * | 5/2018 | Hendrickson | ....... F01N 13/0093 |
| 2019/0368402 | A1 * | 12/2019 | Barrientos Betancourt | ................ F01N 3/0842 |
| 2022/0213823 | A1 * | 7/2022 | Ramirez | ............. B60W 30/188 |

FOREIGN PATENT DOCUMENTS

| | | | |
|---|---|---|---|
| DE | 102014216217 A1 * | 2/2016 | ........... F01N 3/0842 |
| DE | 102014216217 A1 | 2/2016 | |

\* cited by examiner

US 11,739,674 B2

METHOD FOR CONTROLLING THE OPERATION OF AN ENGINE SYSTEM IN A VEHICLE

TECHNICAL FIELD

The present invention relates to a method for controlling the operation of an engine system in a vehicle, the engine system comprising an engine and an exhaust aftertreatment system having a selective catalytic reduction, SCR, catalyst and a diesel particulate filter, DPF. The invention further relates to a controlling apparatus for a vehicle, to a vehicle, and to a computer program.

BACKGROUND

A vehicle typically comprises an engine for propelling the vehicle. The engine may be powered by various means, such as e.g. by liquid or gaseous fuel in an internal combustion engine, or by electric power in an electric machine. Moreover, hybrid solutions exist in which the vehicle is propelled both by an internal combustion engine and an electric machine.

In case the engine is a diesel engine, it is typical to provide the vehicle with an exhaust aftertreatment system (EATS) to handle emissions from the diesel engine. An EATS typically includes a diesel oxidation catalyst (DOC), a diesel particulate filter (DPF), and a selective catalytic reduction (SCR) catalyst. Urea, or an ammonia comprising substance, is injected upstream of the SCR catalyst to assist in converting nitrogen oxides, also referred to as NOx, with the aid of a catalyst, into diatomic nitrogen (N2), and water (H2O), and potentially carbon dioxide (CO2). The cleaned, or at least emission reduced, exhaust gases then leaves the EATS and the vehicle through the tailpipe of the vehicle. The engine and the EATS may be referred to as an engine system.

Government regulations, together with a constant demand for increased fuel economy of the vehicle, implies a need for a more efficient control of the EATS. One vehicle operation that is subject to improvement with regards to emissions is restart of the engine (e.g. cold-start of the engine, in which the EATS has not reached the working temperature), occurring subsequent to an engine shut-off. A vehicle operation of engine shut-off is desirable from a diesel fuel consumption point of view. Moreover, it is from an EATS temperature point of view desirable to shut-off the engine as a relatively low temperature in the EATS is beneficial for transforming injected urea into NH3. However, to secure high conversion efficiency of NOx, it is on the other hand preferred to have sufficient high temperature, but also to have ammonia stored in the SCR catalyst, the capacity of the latter decreasing with an increasing temperature.

Thus, the operation of the engine system and in particular the EATS is relatively complex and depends on various parameters, and there is a need in the industry for an improved operation of the engine system to reduce emissions from the vehicle.

SUMMARY

It is an object of the present invention to at least partly alleviate the shortcomings discussed above in relation to known engine systems comprising an exhaust aftertreatment system, and to improve the operation of such engine systems.

According to a first aspect of the present invention, a method for controlling the operation of an engine system in a vehicle, the engine system comprising an engine and an exhaust aftertreatment system having a selective catalytic reduction, SCR, catalyst and a diesel particulate filter, DPF, is provided. The method comprises:

determining preview information of the vehicle operation based at least on an upcoming road event and an engine operation associated with the upcoming road event;

performing, in response of the preview information, at least one of the following:

predicting an ammonia storage in the SCR catalyst at least partly based on the current level of ammonia storage in the SCR catalyst, and controlling the operation of the engine system by increasing reductant injection to meet an ammonia storage threshold level in response of predicting an ammonia storage in the SCR catalyst below the ammonia storage threshold level;

predicting an ammonia slip out of the SCR catalyst, and controlling the operation of the engine system by increasing the engine out NOx to reduce the ammonia storage in the SCR catalyst to meet an ammonia slip threshold level in the SCR catalyst in response of predicting an ammonia slip above the ammonia slip threshold level;

predicting a soot level in the DPF, and controlling the operation of the engine system by decreasing the engine out NOx to increase the amount of engine out particles to meet a soot threshold level in the DPF in response of predicting a soot level below the soot threshold level.

Hereby, preview information can be used to improve the operation of the engine system so that the exhaust aftertreatment system is utilized more efficiently. For example, undesired compounds (such as NOx, particles, and NH3) in the exhaust can be reduced, and the emission reduced exhaust gases can leave the exhaust aftertreatment system and the vehicle through the tailpipe of the vehicle. By using preview information which is based on at least the upcoming road events and engine operations associated with the upcoming road events, the operation of the exhaust aftertreatment system can be improved as measures can be taken to respond to the future, expected or predicted operation of the vehicle (i.e. at least the future, expected or predicted engine operations associated with the upcoming road events).

It should be noted that the preview information of the vehicle operation is related to future, expected or predicted, operation of the vehicle, typically expected to occur in the near future, e.g. in 1 s to 15 min, or in 10 s to 15 min, or in 1 min to 15 min. The preview information of the vehicle operation is based on an upcoming road event, such as e.g. upcoming topology of the road (e.g. a downhill or uphill) and/or upcoming road curves and/or upcoming road conditions. The upcoming road event may additionally or alternatively include upcoming parking lots or upcoming traffic lights or expected traffic jams. For any such upcoming road event, the operation of the vehicle is typically associated with a corresponding engine operation, i.e. a future, expected or predicted engine operation in response to the upcoming road event. For example, if the upcoming road event comprises a parking lot in which the vehicle is to be parked, the engine operation associated with such upcoming parking lot may e.g. be predicted engine shut-off, as the vehicle is to be parked in the parking lot (other engine operations associated with such upcoming parking lot may be predicted reduced engine speed and predicted downshifting prior to the predicted engine shut-off). Another example of an upcoming road event is an upcoming uphill. The engine operation association with such upcoming uphill may e.g. be predicted downshifting and/or predicted increased engine torque, as the vehicle is to drive uphill with e.g. a maintained speed or at a speed resulting in a desired balance between vehicle speed and fuel consumption.

According to at least one example embodiment, the preview information comprises the engine operation association with upcoming road event, i.e. the predicted engine operation. According to at least one example embodiment, the preview information comprises the upcoming road event.

According to at least one example embodiment, the preview information comprises predicted engine speed and/or predicted engine torque in response of the upcoming road event.

The predicted engine speed and/or predicted engine torque are important parameters of the engine operation, influencing e.g. fuel consumption, vehicle speed, emissions out from the engine and/or emissions out from the exhaust aftertreatment system, thermal events, etc. Thus, by the preview information of at least the predicted engine speed and/or predicted engine torque, the operation of the exhaust aftertreatment system may be improved by acting in response to such preview information.

According to at least one example embodiment, the vehicle is a hybrid vehicle comprising an electric machine for propelling the vehicle in addition to the engine.

Hereby, the operational time, or power, of the engine (typically a diesel engine) can be reduced. Moreover, for at least some vehicle operations, the engine may be shut-off, and the vehicle may be propelled solely by the electric machine, which will be further described below. Typically, the vehicle comprises energy storage or transformation devices, such as batteries or fuel cells, for powering the electric machine.

According to at least one example embodiment, the preview information comprises a predicted engine shut-off, and in response to the predicted engine shut-off the method comprising performing the step of increasing reductant injection to meet an ammonia storage threshold level in the SCR catalyst while preventing engine shut-off.

Hereby, the engine is prevented from being shut-off with an insufficient ammonia storage in the SCR catalyst (i.e. an ammonia storage below the ammonia storage threshold level). Such insufficient ammonia storage in the SCR catalyst could otherwise result in unnecessary high amount of emissions (typically NOx) upon restart of the engine. By preventing engine shut-off, the ammonia storage in the SCR catalyst can be assured above the ammonia storage threshold level, and unnecessary high amount of emissions (typically NOx) upon restart of the engine can be avoided. If the ammonia storage threshold level is determined to be met for the upcoming road event (e.g. by determining the current level of ammonia storage and predicted change of the ammonia storage up until the upcoming road event), no control of the operation of the engine system by increasing reductant injection to meet the ammonia storage threshold level is needed.

According to at least one example embodiment, the method comprises determining a current level of ammonia storage in the SCR catalyst, and increasing reductant injection to meet an ammonia storage threshold level in the SCR catalyst while preventing engine shut-off, in response of determining that the current level of ammonia storage is below the ammonia storage threshold level.

According to at least one example embodiment, the method comprises determining a current level of ammonia storage in the SCR catalyst, and predicting the level of ammonia storage in the SCR catalyst based on the current level of ammonia storage and change in ammonia storage up until the upcoming road event, and increasing reductant injection to meet an ammonia storage threshold level in the SCR catalyst while preventing engine shut-off, in response of determining that the predicted level of ammonia storage will be below the ammonia storage threshold level at the upcoming road event.

According to at least one example embodiment, the method further comprises:
  subsequently of meeting the ammonia storage threshold level in the SCR catalyst, enabling or performing engine shut-off.

Hereby, the engine may be shut-off in order to e.g. reduce fuel consumption and/or emissions, while ensuring that the ammonia storage in the SCR catalyst is sufficient (i.e. above the ammonia storage threshold level).

According to at least one example embodiment, the method further comprises:
  propelling the vehicle with the electric machine and the engine off.

Thus, the vehicle may be propelled even though the engine is off. Such operation is typically applicable while driving downhill, or while maintaining vehicle speed during travel. Thus, engine shut-off may be different to vehicle off or to vehicle standstill, the latter being associated with a standstill of the vehicle with no engine or electric machine running. However, according to at least one alternative example embodiment, the engine-off is associated with vehicle off.

According to at least one example embodiment, the reductant may be anhydrous ammonia, aqueous ammonia, aqueous urea or a diesel exhaust fluid comprising ammonia.

According to at least one example embodiment, the preview information comprises a predicted thermal event resulting in a temperature in the exhaust aftertreatment system above a threshold temperature.

The predicted thermal event is an important parameter of the engine operation, influencing e.g. emissions out from the engine and/or emissions out from the exhaust aftertreatment system. The predicted thermal event may be based on, or a direct consequence of, the predicted engine speed and/or predicted engine torque. Thus, by the preview information of at least the predicted thermal event, the operation of the exhaust aftertreatment system may be improved by acting in response to such preview information. For example, for an upcoming road event comprising an uphill, a predicted thermal event resulting in a temperature in the exhaust aftertreatment system above a threshold temperature may be expected, as the engine is typically required to operate harder (e.g. by increased engine torque) in order to overcome the uphill.

According to at least one example embodiment, the threshold temperature corresponds to a temperature causing an ammonia slip out of the SCR catalyst above the ammonia slip threshold level, and the method comprises, in response to the predicted thermal event, performing the step of increasing the engine out NOx to reduce the ammonia storage in the SCR catalyst to meet the ammonia slip.

Hereby, the ammonia slip out of the SCR catalyst can be reduced as the engine out NOx may react with the ammonia in the SCR catalyst, resulting in a reduction of the ammonia storage in the SCR catalyst, and hence a reduced ammonia slip during the thermal event. In other words, ammonia in the SCR catalyst may be consumed by the engine out NOx prior to the predicted thermal event occurs, typically to a level below the ammonia slip threshold level.

According to at least one example embodiment, the threshold temperature corresponds to a temperature causing a regeneration of the DPF and a soot level below the soot threshold level, and the method comprises, in response to the predicted thermal event, performing the step of decreasing the engine out NOx to increase the amount of engine out particles to meet the soot threshold level.

At a temperature causing a regeneration of the DPF, the temperature is sufficiently high to burn off, or oxidize, the soot particles in the DPF. Hereby, a soot level below the soot threshold level can be avoided, and release of particles, typically micro and/or nano sized particles, which are prone to escape or leak through the DPF if the sooth level is below the soot threshold level (i.e. a DPF which is substantially clean and contains no, or very little, soot) can be avoided. In other words, by decreasing the engine out NOx, which results in an increase of engine out particles, the soot level in the DPF is enabled to reach at least the soot threshold level, prior to the predicted thermal event occurs. Thus, release of particles, typically micro and/or nano sized particles when the predicted thermal event occurs, may be reduced or avoided.

According to at least one example embodiment, the threshold temperature corresponds to a temperature causing the ammonia storage in the SCR catalyst to drop below the ammonia storage threshold level, and the method comprises, in response to the predicted thermal event, increasing reductant injection to meet the ammonia storage threshold level in the SCR.

Hereby, an insufficient ammonia storage in the SCR catalyst, and/or an insufficient reduction of the NOx by injected reductant and ammonia from the ammonia storage in the SCR catalyst, can be avoided. In other words, by increasing reductant injection, which results in an increase of ammonia storage in the SCR catalyst and/or an increased amount of reductant (typically urea) and ammonia in the exhaust aftertreatment system, a desired amount of NOx can be reduced.

According to at least one example embodiment, the method comprising performing, in response of the preview information, more than one of the previously mentioned steps of controlling the operation of the engine system.

Thus, as some embodiments of controlling the operation of the engine system are counteracting, e.g. increasing the engine out NOx to reduce the ammonia storage in the SCR catalyst in order to reduce or avoid ammonia slip out of the exhaust aftertreatment system, and decreasing the engine out NOx to increase the amount of engine out particles to meet a soot threshold level in the DPF in order to reduce or avoid particle (typically micro and/or nano sized) emissions out of the exhaust aftertreatment system, the different steps for controlling the operation of the engine system are typically carried out subsequently. For example, if an upcoming road event comprises an uphill, with an associated engine operation causing a predicted thermal event resulting in a temperature in the exhaust aftertreatment system above a threshold temperature, wherein the threshold temperature corresponds to a temperature causing an ammonia slip out of the SCR catalyst above the ammonia slip threshold level (i.e. at higher temperature in the SCR catalyst, less ammonia may be stored), and corresponds to a temperature causing a regeneration of the DPF and a soot level below the soot threshold level (i.e. at higher temperatures the DPF is subject to regeneration in which the soot in the DPF is consumed), the steps of controlling the operation of the engine system may comprise a first sub-step of increasing the engine out NOx to reduce the ammonia storage in the SCR catalyst to meet the ammonia slip when the predicted thermal event occurs, and a second sub-step performed subsequently to the first sub-step of decreasing the engine out NOx to increase the amount of engine out particles to meet the soot threshold level. In other words, the operation of the engine system is controlled to first increase the engine out NOx, and then decrease the engine out NOx.

According to at least a second aspect of the invention, a controlling apparatus for a vehicle comprising an engine system, the engine system comprising an engine and an exhaust aftertreatment system having an SCR catalyst and a DPF, is provided. The controlling apparatus being configured to:

determine preview information of the vehicle operation based at least on an upcoming road event and an engine operation associated with the upcoming road event; and perform, in response of the determined preview information, at least one of the following:

a prediction of an ammonia storage in the SCR catalyst at least partly based on the current level of ammonia storage in the SCR catalyst, and a control operation of increasing reductant injection to meet an ammonia storage threshold level in response of a prediction that the ammonia storage in the SCR catalyst is below the ammonia storage threshold level;

a prediction of an ammonia slip out of the SCR catalyst, and a control operation to increase the engine out NOx to reduce the ammonia storage in the SCR catalyst to meet an ammonia slip threshold level in the SCR catalyst in response of a prediction that the ammonia slip is above the ammonia slip threshold level;

a prediction of a soot level in the DPF, and a control operation to decrease the engine out NOx to increase the amount of engine out particles to meet a soot threshold level in the DPF in response of a prediction that the soot level is below the soot threshold level.

Effects and features of the second aspect of the invention are largely analogous to those described above in connection with the first aspect of the invention. Embodiments mentioned in relation to the first aspect of the invention are largely compatible with the second aspect of the invention.

The controlling apparatus may e.g. be, or be comprised in, an electrical control unit (ECU) of the vehicle.

According to at least one example embodiment, the controlling apparatus is configured to perform the method steps according to any of the embodiments mentioned in relation to the first aspect of the invention.

According to a third aspect of the invention, a vehicle comprising an engine system and a controlling apparatus according to the second aspect of the invention is provided. The engine system comprising an engine and an exhaust aftertreatment system having an SCR catalyst and a DPF.

Effects and features of the third aspect of the invention are largely analogous to those described above in connection with the first and second aspects of the invention. Embodiments mentioned in relation to the first and second aspects of the invention are largely compatible with the third aspect of the invention.

Thus, the exhaust aftertreatment system is arranged and configured to handle engine exhaust. The engine is typically a diesel engine.

According to at least one example embodiment, the vehicle is a hybrid vehicle comprising an electric machine for propelling the vehicle in addition to the engine.

As mentioned in the first aspect of the invention, hereby the operational time, or power, of the engine can be reduced. Moreover, for at least some vehicle operations, the engine may be shut-off, and the vehicle may be propelled solely by the electric machine. Typically, the vehicle comprises energy storage or transformation devices, such as batteries or fuel cells, for powering the electric machine.

According to at least one example embodiment, the DPF is arranged upstream of the SCR catalyst in the exhaust aftertreatment system.

Thus, particles which could harm or deteriorate the SCR catalyst may be caught or trapped in the DPF upstream of the SCR catalyst.

According to a fourth aspect of the invention, a computer program comprising program code means for performing the method according the first aspect of the invention, when the program is run on a computer, is provided.

According to a fifth aspect of the invention, a computer readable medium carrying a computer program comprising program code means for performing the method according to the first aspect of the invention, when the program product is run on a computer, is provided.

The order of the method steps described in the first aspect of the invention, and implemented in the second, third and fourth aspects of the invention, is not constrained to that described in the present disclosure. One or several of the steps could switch places, or occur in a different order without departing from the scope of the invention. However, according to at least one example embodiment, the method steps are performed in the consecutive order described in the first aspect of the invention.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
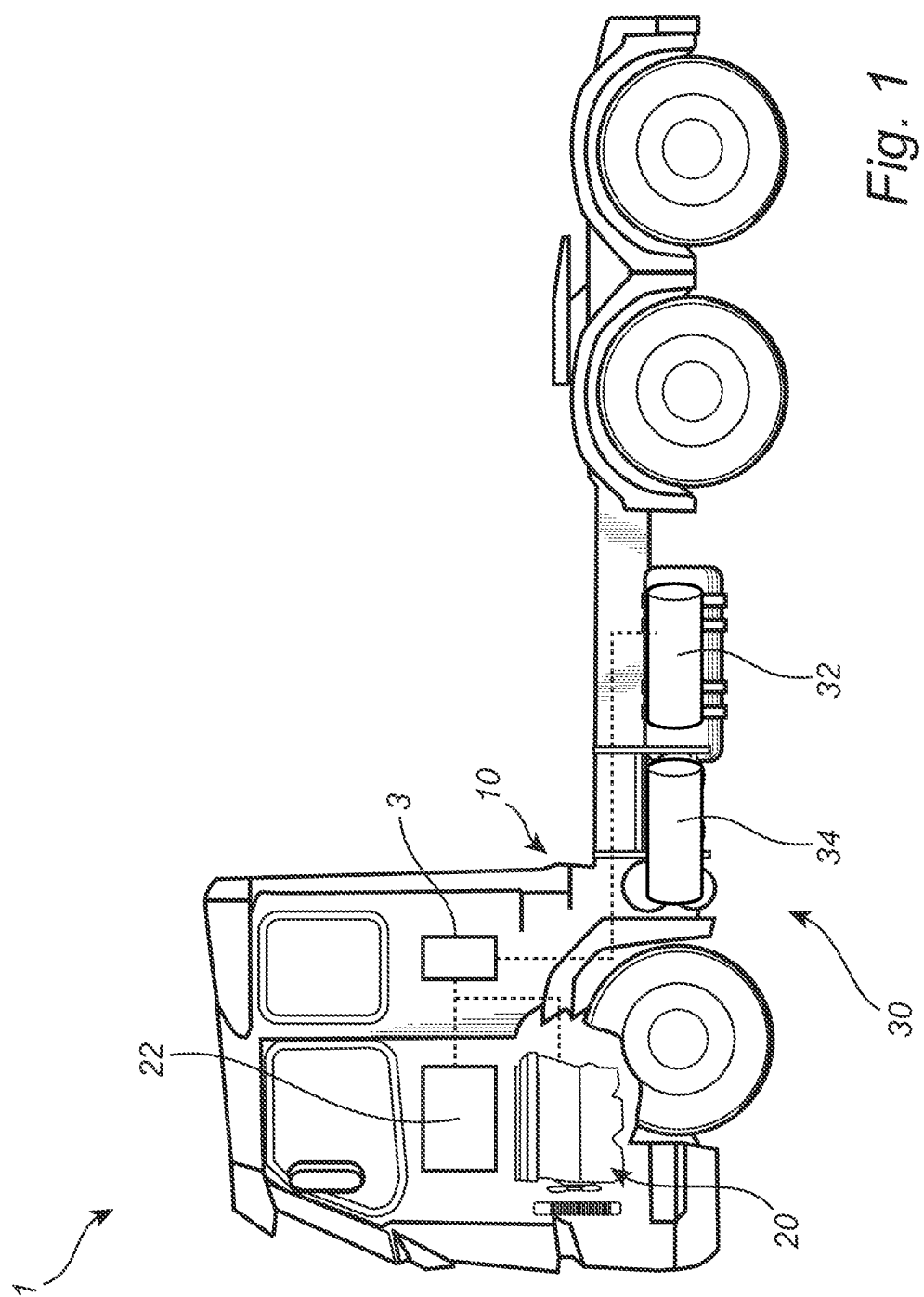
FIG. 1 is a schematic side view of a vehicle comprising an engine system and a controlling apparatus in accordance with an example embodiment of the invention.

With reference to FIG. 1 a vehicle 1, here embodied as a heavy duty truck 1, comprising an engine system 10 is disclosed for which a controlling apparatus 3 of a kind disclosed in the present disclosure is advantageous. However, the controlling apparatus 3 may as well be implemented in other types of vehicles, such as in busses, light-weight trucks, passenger cars, marine applications etc. having similar engine systems. The vehicle 1 of FIG. 1 is a hybrid vehicle 1 comprising an engine 20, being a diesel engine 20, and an electric machine 22. The diesel engine 20 is powered by diesel fuel, typically comprised in a fuel tank (not shown) and the electric machine 22 is powered by electricity supplied from at least one energy storage or transformation device, e.g. a battery or a fuel cell. The diesel engine 20 and the electric machine 22 are typically arranged and configured to individually propel the vehicle 1, by being separately coupled to other parts of the powertrain of the vehicle 1, such as transmission, drive shafts and wheels (not shown in detail). That is, the vehicle 1 may be propelled by the diesel engine 20 alone, the electric machine 22 alone, or by the diesel engine 20 together with the electric machine 22.

In FIG. 1, at least the diesel engine 20 is comprised in an engine system 10, the engine system 10 further comprising an exhaust aftertreatment system 30 having an SCR catalyst 32 and a DPF 34. The DPF, or diesel particulate filter, 34 is arranged upstream of the SCR catalyst 32, and is arranged and configured to remove particles, i.e. diesel particulate matter or soot, from the exhaust gas of the diesel engine 20. The SCR catalyst 32 is arranged and configured to convert nitrogen oxides, also referred to as NOx, with the aid of a catalyst, into diatomic nitrogen ($N_2$), and water ($H_2O$) (and potentially carbon dioxide $CO_2$). A reductant, typically anhydrous ammonia, aqueous ammonia or urea solution (commonly referred to as urea in the present disclosure), is added to engine exhausts and is absorbed onto the catalyst in the SCR catalyst 32.

The controlling apparatus 3 of the vehicle 1 is configured to control the operation of the engine system 10, i.e. at least the diesel engine 20 and the exhaust aftertreatment system 30, by means of preview information 100 of the vehicle operation based at least on an upcoming road event 110, 120, 130 and an engine operation 210, 220, 230 associated with the upcoming road event 110, 120, 130 which now will be further described with reference to FIGS. 2A-2B and FIG. 3.

Figure 2A:
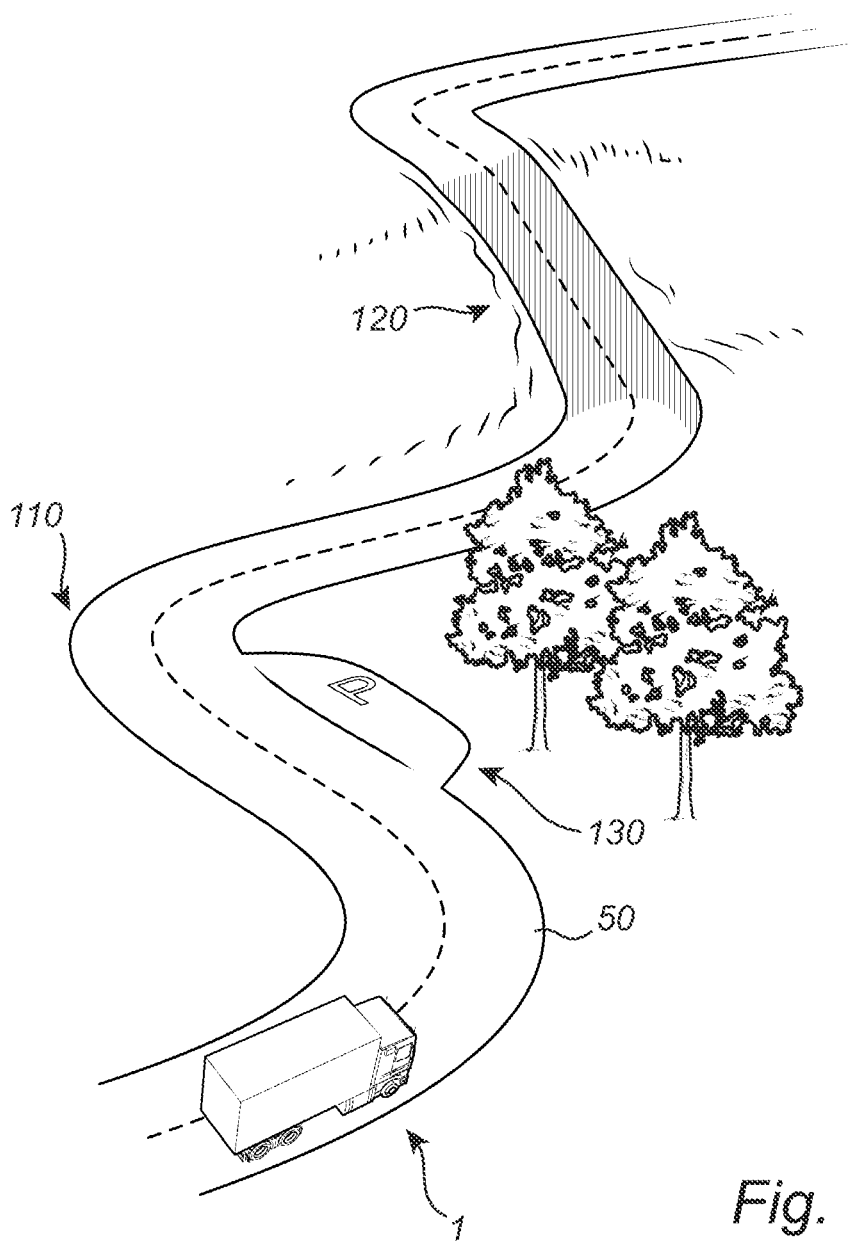
FIG. 2A is a schematic perspective view of a vehicle traveling along a road with upcoming road events, applicable to example embodiments of the invention.
Figure 2B:
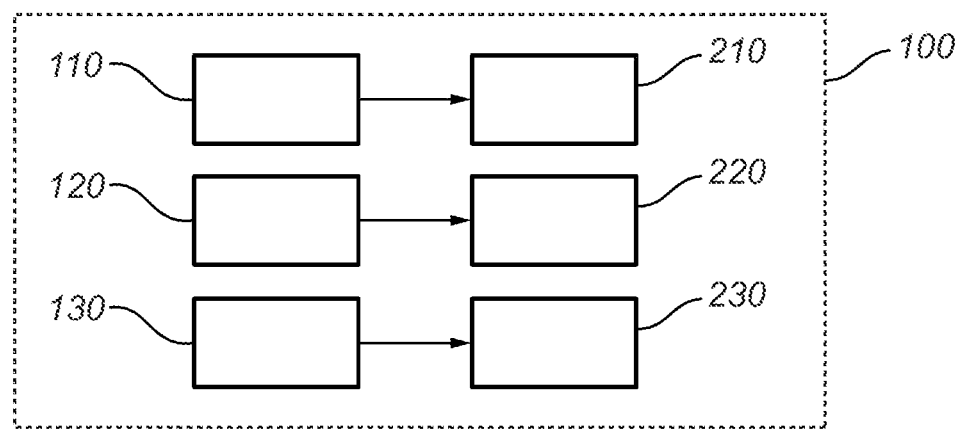
FIG. 2B shows a schematic example of preview information of the vehicle operation based on upcoming road events and associated engine operations, applicable to example embodiments of the invention.

In FIG. 2A, a vehicle 1, such as the hybrid vehicle 1 in FIG. 1, is travelling along a road 50 and is approaching a road curve 110 and uphill 120. Moreover, a parking lot 130, in which the vehicle 1 may park, is present further down the road 50 on the right hand side of vehicle 1. The road curve 110, the uphill 120 and parking lot 130 are examples of upcoming road events 110, 120, 130. The vehicle 1 may be configured to adapt the vehicle operation based on the upcoming road events 110, 120, 130. For example, by acknowledging the uphill 120, and e.g. the length and inclination of the uphill 120, a vehicle operation in which the gear is adapted (typically downshifting for increased engine torque) may be prepared and initiated prior to that the vehicle 1 reach the uphill 120. In other words, the vehicle operation is at least partly defined by the engine operation (here downshifting). In a corresponding manner, various upcoming road events may be associated with a corresponding engine operation. This is exemplified in FIG. 2B, in which the already discussed uphill 120 is associated with an engine operation of downshifting and increased engine torque 210, wherein the road curve 110 (e.g. being a steep road curve 110) is associated with an engine operation of reduced engine speed 220, and wherein the parking lot 130 is associated with an engine operation of engine shut-off 230 (the latter e.g. being comprised in an vehicle operation of vehicle off). Other upcoming road events may e.g. be a downhill with the associated engine operation of engine shut-off. For the latter, the electric machine may propel the vehicle.

The upcoming road events 110, 120, 130 and the engine operations 210, 220, 230 may be commonly referred to as preview information 100 of the vehicle. The upcoming road events 110, 120, 130 are typically acquired from map data (comprising topology data), and is related to the position of vehicle 1 by means of a GPS or other vehicle localization means. The engine operations 210, 220, 230 are typically related to the upcoming road events 110, 120, 130 by means of models and/or otherwise predicted and required engine operation, known to the skilled person.

Figure 3:
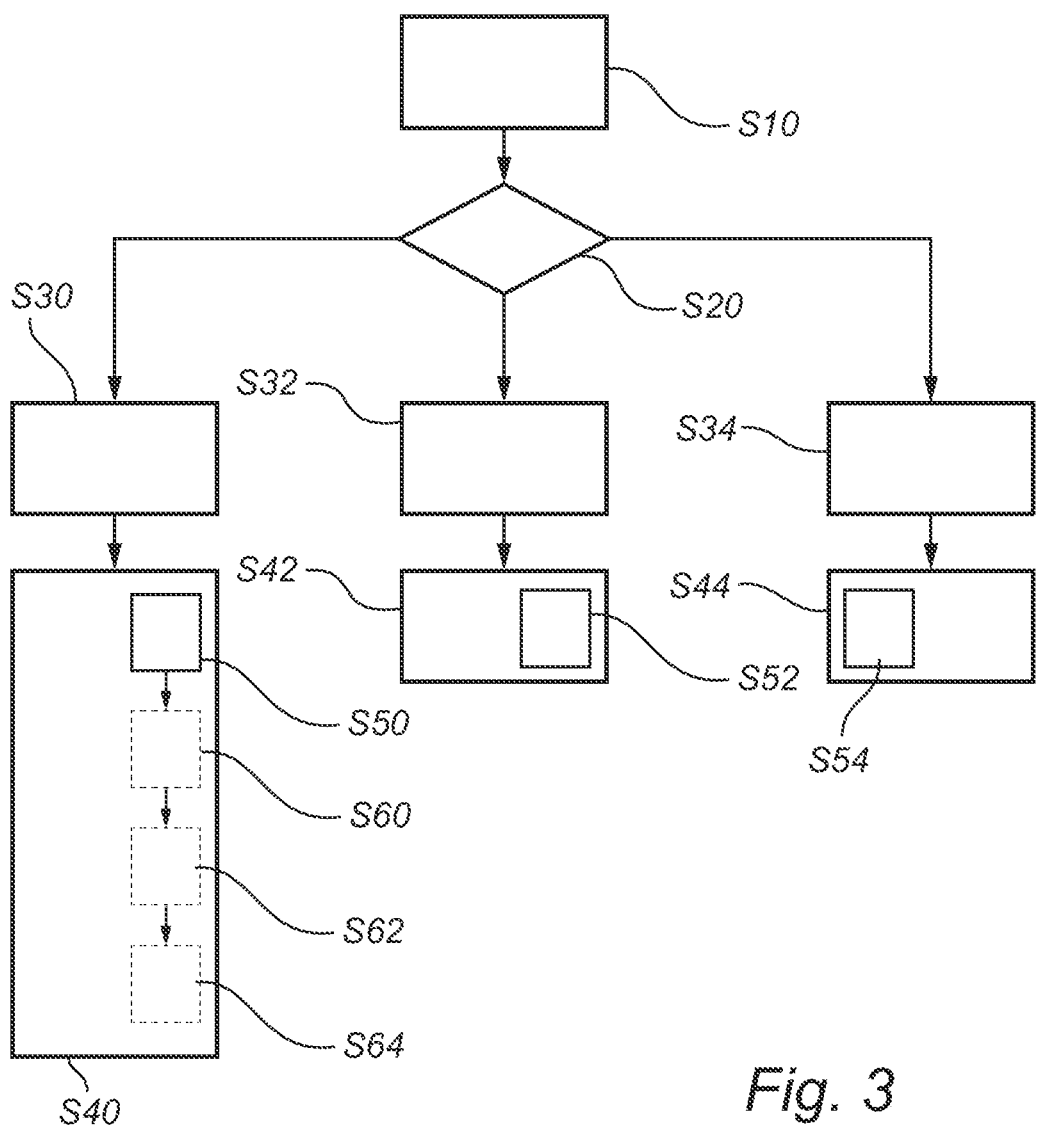
FIG. 3 is a flowchart illustrating the steps of a method in accordance with one example embodiment of the invention.

Turning to the flowchart of FIG. 3, schematically illustrating steps of a method for controlling the operation of an engine system in a vehicle, such as the engine system 10 of vehicle 1 in FIG. 1. Thus, the engine system comprises an engine, e.g. diesel engine 20 in FIG. 1, and an exhaust aftertreatment system, e.g. exhaust aftertreatment system 30 in FIG. 1, having a selective catalytic reduction, SCR, catalyst, e.g. SCR catalyst 32 in FIG. 1, and a diesel particulate filter, DPF, e.g. DPF 34 in FIG. 1.

In a step S10, e.g. being a first step S10, preview information (as the preview information 100 of FIG. 2B) of the vehicle operation is determined. The preview information is based at least on an upcoming road event (as e.g. the upcoming road events 110, 120, 130 of FIGS. 2A-2B) and an engine operation (as e.g. the engine operations 210, 220, 230 of FIG. 2B) associated with the upcoming road event.

In a step S20, e.g. being a second step S20, a choice between three various embodiments of performing a prediction and control of the engine system is made in response to the preview information determined in step S10. The three various embodiments will now be described in further detail.

In at least a first embodiment, an ammonia storage in the SCR catalyst is predicted in a step S30, e.g. being a first step S30 of the first embodiment. The predicted ammonia storage in the SCR catalyst is at least partly based on the current level of ammonia storage in the SCR catalyst.

In a step S40, being e.g. a second step S40 of the first embodiment, the operation of the engine system is controlled by a step S50, being e.g. a first sub-step S50 of the first embodiment, of increasing urea injection to meet an ammonia storage threshold level in response of predicting S30 an ammonia storage in the SCR catalyst below the ammonia storage threshold level. The step S50 is according to one embodiment carried out in response to a preview information in step S10 comprising a predicted engine shut-off (as e.g. the engine shut-off 230 in FIG. 2).

In a step S60, being e.g. a second sub-step S60 of the first embodiment, engine shut-off is prevented. That is, the engine or diesel engine is prevented from being shut-off, typically as long as the ammonia storage in the SCR catalyst is below the ammonia storage threshold level. In other words, in response to a predicted engine shut-off (from the determined preview information in step S10), the step S50 of increasing urea injection to meet an ammonia storage threshold level in the SCR catalyst is performed while preventing engine shut-off S60.

Subsequently of meeting the ammonia storage threshold level in the SCR catalyst, or based on a prediction that the ammonia storage threshold level in the SCR catalyst will be reached upon the engine shut-off (i.e. upon the occurrence of the engine shut-off with no active prevention of engine shut-off), the method may comprise a step S62, being e.g. a third sub-step S62 of the first embodiment, of enabling or performing engine shut-off. Thus, the engine is allowed to be shut-off as the ammonia storage in the SCR catalyst is sufficient.

According to at least one example embodiment, the vehicle is a hybrid vehicle comprising an electric machine (as e.g. the electric machine 22 in FIG. 1) arranged and configured to propel the vehicle in addition to the engine. Thus, subsequent to performing engine shut-off S62, the method may comprise a step S64, being e.g. a fourth sub-step S64 of the first embodiment, of propelling the vehicle with the electric machine and the engine off.

As shown in FIG. 3, the first, second, third and fourth sub-steps, S50, S60, S62, S64 may be comprised in the step S40 of controlling the operation of the engine system. Moreover, the steps S60, S62 and S64 are optional, which is indicated by dashed line boxes in FIG. 3.

In at least a second embodiment, an ammonia slip out of the SCR catalyst is predicted in a step S32, e.g. being a first step S32 of the second embodiment.

In a step S42, being e.g. a second step S42 of the second embodiment, the operation of the engine system is controlled by a step S52, being e.g. a first sub-step S52 of the second embodiment, of increasing the engine out NOx to reduce the ammonia storage in the SCR catalyst to meet an ammonia slip threshold level in the SCR catalyst in response of predicting an ammonia slip above the ammonia slip threshold level.

The step S52 is according to one embodiment carried out in response to a preview information in step S10 comprising a predicted thermal event (as e.g. the predicted thermal event 220 in FIG. 2) resulting in a temperature in the exhaust aftertreatment system above a threshold temperature. The step S52 is typically carried out in response of a threshold temperature corresponding to a temperature causing an ammonia slip out of the SCR catalyst above the ammonia slip threshold level. In other words, in response to a predicted thermal event, the step 52 of increasing the engine out NOx to reduce the ammonia storage in the SCR catalyst to meet the ammonia slip, is performed.

In at least a third embodiment, a soot level in the DPF is predicted in a step S34, e.g. being a first step S34 of the third embodiment.

In a step S44, being e.g. a second step S44 of the third embodiment, the operation of the engine system is controlled by a step S54, being e.g. a first sub-step S54 of the third embodiment, of decreasing the engine out NOx to increase the amount of engine out particles to meet a soot threshold level in the DPF in response of predicting a soot level below the soot threshold level.

The step S54 is according to one embodiment carried out in response to a preview information in step S10 comprising a predicted thermal event (as e.g. the predicted thermal event 220 in FIG. 2) resulting in a temperature in the exhaust aftertreatment system above a threshold temperature. The step S54 is typically carried out in response of a threshold temperature corresponding to a temperature causing a regeneration of the DPF and a soot level below the soot threshold level. In other words, in response to a predicted thermal event, the step 54 of decreasing the engine out NOx to increase the amount of engine out particles to meet a soot threshold level in the DPF in response of predicting a soot level below the soot threshold level, is performed.

As an alternative fourth embodiment, the step S50 is carried out in response to a preview information in step S10 comprising a thermal event. In other words, in response to a predicted thermal event, the steps S20, S30, S40 and S50 of increasing urea injection to meet the ammonia storage threshold level in the SCR, is performed.

According to at least one example embodiment, the steps of the method according to the first, second, third and fourth embodiments, may be combined and performed subsequently of each other. It should be noted that the naming of the steps not necessarily, but might according to at least one example embodiment, relate to the order in which the steps are carried out. Thus, the order of the steps may be different than that explained here, unless explicitly being dependent on each other.

Turning back to FIGS. 1, 2A and 2B, the controlling apparatus 3 of vehicle 1 may be configured to carry out one or more of the steps of the method described with reference to FIG. 3. For example, the controlling apparatus 3 may be a computer comprising a computer program comprising program code means for performing the method according to one or more of the steps described with reference to FIG. 3.

In other words, the controlling apparatus 3 is at least configured to:
- determine preview information 100 of the vehicle operation based at least on an upcoming road event 110, 120, 130 and an engine operation 210, 220, 230 associated with the upcoming road event 110, 120, 130; and
- perform, in response of the determined preview information 100, at least one of the following:
  - a prediction of an ammonia storage in the SCR catalyst 32 at least partly based on the current level of ammonia storage in the SCR catalyst 32, and a control operation of the engine system 10 of increasing urea injection to meet an ammonia storage threshold level in response of a prediction that the ammonia storage in the SCR catalyst 32 is below the ammonia storage threshold level (i.e. as described with reference to steps S30, S40 and S50 of FIG. 3);
  - a prediction of an ammonia slip out of the SCR catalyst 32, and a control operation of the engine system 10 to increase the engine out NOx to reduce the ammonia storage in the SCR catalyst 32 to meet an ammonia slip threshold level in the SCR catalyst 32 in response of a prediction that the ammonia slip is above the ammonia slip threshold level (i.e. as described with reference to steps S32, S42 and S52 of FIG. 3);
  - a prediction of a soot level in the DPF 34, and a control operation of the engine system 10 to decrease the engine out NOx to increase the amount of engine out particles to meet a soot threshold level in the DPF 34 in response of a prediction that the soot level is below the soot threshold level (i.e. as described with reference to steps S34, S44 and S54 of FIG. 3).

It is to be understood that the present invention is not limited to the embodiments described above and illustrated in the drawings; rather, the skilled person will recognize that many changes and modifications may be made within the scope of the appended claims.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for controlling an operation of an engine system in a vehicle, the engine system comprising an engine and an exhaust aftertreatment system having a selective catalytic reduction (SCR) catalyst and a diesel particulate filter (DPF) the method comprising: determining preview information of the vehicle operation based at least on an upcoming road event and an engine operation associated with the upcoming road event; performing, in response of the preview information: predicting an ammonia storage in the SCR catalyst at least partly based on a current level of ammonia storage in the SCR catalyst, and controlling the operation of the engine system by increasing reductant injection to meet an ammonia storage threshold level in response to predicting the ammonia storage in the SCR catalyst below the ammonia storage threshold level; wherein the preview information comprises a predicted engine shut-off; and in response to the predicted engine shut-off, increasing reductant injection to meet an ammonia storage threshold level in the SCR catalyst while preventing engine shut-off.

2. The method according to claim 1, wherein the preview information comprises predicted engine speed and/or predicted engine torque in response to the upcoming road event.

3. The method according to claim 1, wherein the vehicle is a hybrid vehicle comprising an electric machine for propelling the vehicle in addition to the engine.

4. The method according to claim 1, further comprising: subsequently of meeting the ammonia storage threshold level in the SCR catalyst, enabling or performing engine shut-off.

5. The method according to claim 4, further comprising: propelling the vehicle with the electric machine while the engine is off.

6. The method according to claim 1, wherein the preview information comprises a predicted thermal event resulting in a temperature in the exhaust aftertreatment system above a threshold temperature.

7. The method according to claim 6, further comprising performing, in response of the preview information: predicting an ammonia slip out of the SCR catalyst, and controlling the operation of the engine system by increasing the engine out NOx to reduce the ammonia storage in the SCR catalyst to meet an ammonia slip threshold level in the SCR catalyst in response to predicting an ammonia slip above the ammonia slip threshold level; wherein the threshold temperature corresponds to a temperature causing an ammonia slip out of the SCR catalyst above the ammonia slip threshold level, and in response to the predicted thermal event, performing the step of increasing the engine out NOx to reduce the ammonia storage in the SCR catalyst to meet the ammonia slip.

8. The method according to claim 6, further comprising predicting a soot level in the DPF, and controlling the operation of the engine system by decreasing the engine out NOx to increase the amount of engine out particles to meet a soot threshold level in the DPF in response to predicting a soot level below the soot threshold level; wherein the threshold temperature corresponds to a temperature causing a regeneration of the DPF and a soot level below the soot threshold level, and in response to the predicted thermal event, performing the step of decreasing the engine out NOx to increase the amount of engine out particles to meet the soot threshold level.

9. The method according to claim 6, wherein the threshold temperature corresponds to a temperature causing the ammonia storage in the SCR catalyst to drop below the ammonia storage threshold level, and in response to the predicted thermal event, increasing reductant injection to meet the ammonia storage threshold level in the SCR.

10. A controller for a vehicle comprising an engine system, the engine system comprising an engine and an exhaust aftertreatment system having an SCR catalyst and a DPF, the controller being configured to: determine preview information of a vehicle operation based at least on an upcoming road event and an engine operation associated with the upcoming road event; and perform, in response to the determined preview information: a prediction of an ammonia storage in the SCR catalyst at least partly based on a current level of ammonia storage in the SCR catalyst, and a control operation of increasing reductant injection to meet an ammonia storage threshold level in response to a prediction that the ammonia storage in the SCR catalyst is below the ammonia storage threshold level; wherein the preview information comprises a predicted engine shut-off; and in response to the predicted engine shut-off, increasing reductant injection to meet an ammonia storage threshold level in the SCR catalyst while preventing engine shut.

11. A vehicle comprising the engine system and the controller according to claim 10.

12. The vehicle according to claim 11, being a hybrid vehicle comprising an electric machine for propelling the vehicle in addition to the engine.

13. The vehicle according to claim 11, wherein the DPF is arranged upstream of the SCR catalyst in the exhaust aftertreatment system.

\* \* \* \* \*